US007846521B2

(12) United States Patent
Yokokawa

(10) Patent No.: US 7,846,521 B2
(45) **Date of Patent: *Dec. 7, 2010**

(54) PRINTABLE AND SPLITTABLE MEDIUM

(75) Inventor: Kazuyuki Yokokawa, Kawasaki (JP)

(73) Assignee: Avery Dennison Corporation, Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/134,724

(22) Filed: May 20, 2005

(65) Prior Publication Data

US 2005/0208254 A1 Sep. 22, 2005

Related U.S. Application Data

(63) Continuation of application No. 09/801,187, filed on Mar. 8, 2001.

(30) Foreign Application Priority Data

Mar. 9, 2000 (JP) ............................... 2000/71013
May 19, 2000 (JP) ............................. 2000/152774

(51) Int. Cl.
*B32B 9/00* (2006.01)
*B32B 29/00* (2006.01)
*B65D 65/28* (2006.01)
*B41M 5/00* (2006.01)

(52) U.S. Cl. .................... 428/40.1; 428/41.3; 428/41.5; 428/42.1; 428/42.2; 428/43; 428/195.1; 428/537.5

(58) Field of Classification Search ................ 428/40.1, 428/41.3, 41.5, 42.1, 42.2, 43, 195.1, 537.5
See application file for complete search history.

(56) References Cited

U.S. PATENT DOCUMENTS 2,434,545 A 1/1948 Brady, Jr.
3,038,597 A 6/1962 Brady, Jr.

(Continued)

FOREIGN PATENT DOCUMENTS

DE 19519584 12/1996

(Continued)

OTHER PUBLICATIONS

Office action dated Mar. 17, 2009 from corresponding German Application No. 10127654.0.

(Continued)

*Primary Examiner*—Victor S Chang
(74) *Attorney, Agent, or Firm*—Patent Group Law Department

(57) ABSTRACT

According to the invention, the resin film to be divided is finely divided along the grooves, whereby the ends of images or characters of photos or the like can be cut off finely. The resin film to be divided is provided with the grooves, thereby finely cutting off the ends of images or characters output on the surface thereof. Further, the resin film is as the lowermost layer, the adhesive layer is provided thereon, and the paper or plastic film with the image receiving layer coat is provided thereon. The grooves formed by cutting the paper or plastic film with image receiving layer coat are previously provided, and the grooves enter a portion of the resin film to be divided, whereby after an image is received, the ends of the film can be finely cut off.

38 Claims, 3 Drawing Sheets

U.S. PATENT DOCUMENTS

| | | | | |
|---|---|---|---|---|
| 3,072,024 | A | 1/1963 | Wengel | |
| 3,568,829 | A | 3/1971 | Brady, Jr. | |
| 3,896,246 | A * | 7/1975 | Brady, Jr. | 428/42.2 |
| 3,985,927 | A | 10/1976 | Norris et al. | |
| 4,048,736 | A | 9/1977 | Castleman et al. | |
| 4,128,430 | A | 12/1978 | Newman et al. | |
| 4,264,662 | A | 4/1981 | Taylor et al. | |
| 4,380,564 | A | 4/1983 | Cancio et al. | |
| 4,428,857 | A * | 1/1984 | Taylor et al. | 252/193 |
| 4,465,729 | A | 8/1984 | Cancio et al. | |
| 4,732,069 | A | 3/1988 | Wood et al. | |
| 4,863,772 | A | 9/1989 | Cross | |
| 4,910,070 | A | 3/1990 | Al'Hariri | |
| 5,007,191 | A | 4/1991 | Klein | |
| 5,087,405 | A * | 2/1992 | Maker | 264/255 |
| 5,198,275 | A | 3/1993 | Klein | |
| 5,238,269 | A | 8/1993 | Levine | |
| 5,275,868 | A * | 1/1994 | Popat et al. | 428/195.1 |
| 5,284,689 | A | 2/1994 | Laurash et al. | |
| 5,296,279 | A | 3/1994 | Bernbaum et al. | |
| 5,366,250 | A | 11/1994 | Sunabe | |
| 5,407,893 | A | 4/1995 | Koshizuka et al. | |
| 5,560,966 | A | 10/1996 | Kishimoto et al. | |
| 5,571,587 | A | 11/1996 | Bishop et al. | |
| 5,665,504 | A | 9/1997 | Malhotra | |
| 5,702,789 | A | 12/1997 | Fernandez-Kirchberger | |
| 5,853,837 | A | 12/1998 | Popat | |
| 5,914,165 | A | 6/1999 | Freedman | |
| 5,936,227 | A | 8/1999 | Truggelmann et al. | |
| 5,993,928 | A | 11/1999 | Popat | |
| 5,997,680 | A | 12/1999 | Popat | |
| 6,016,618 | A | 1/2000 | Attia et al. | |
| 6,039,356 | A | 3/2000 | Warther et al. | |
| 6,159,568 | A | 12/2000 | Freedman et al. | |
| 6,164,851 | A | 12/2000 | Sakamoto et al. | |
| 6,173,649 | B1 * | 1/2001 | Onishi | 101/483 |
| 6,284,708 | B1 | 9/2001 | Oshima et al. | |
| 6,358,587 | B1 | 3/2002 | Saint et al. | |
| 6,380,132 | B1 | 4/2002 | Mihara et al. | |
| 6,627,286 | B1 | 9/2003 | Lutz | |
| 6,827,373 | B2 | 12/2004 | Zumberge | |
| 7,377,996 | B2 | 5/2008 | Bilodeau | |
| 7,579,076 | B2 | 8/2009 | Ishikawa | |
| 2001/0007703 | A1 | 7/2001 | Weirather et al. | |
| 2001/0036525 | A1 | 11/2001 | Yokokawa | |
| 2003/0148056 | A1 | 8/2003 | Utz et al. | |
| 2003/0232191 | A1 | 12/2003 | Ishikawa | |
| 2004/0209029 | A1 | 10/2004 | Utz et al. | |
| 2005/0087977 | A1 | 4/2005 | Crum | |
| 2005/0089664 | A1 | 4/2005 | Utz et al. | |
| 2005/0095388 | A1 | 5/2005 | Utz et al. | |
| 2005/0175807 | A1 | 8/2005 | Bilodeau | |
| 2005/0208254 | A1 | 9/2005 | Yokokawa | |
| 2006/0028015 | A1 | 2/2006 | Ray | |
| 2007/0141292 | A1 | 6/2007 | Utz et al. | |
| 2007/0275204 | A1 | 11/2007 | Ugolick | |

FOREIGN PATENT DOCUMENTS

| | | |
|---|---|---|
| DE | 29805481 | 9/1998 |
| DE | 19813314 | 9/1999 |
| DE | 29907361 | 3/2000 |
| DE | 19945254 | 8/2001 |
| DE | 69909841 | 5/2004 |
| EP | 0894621 | 2/1999 |
| EP | 0987195 | 3/2000 |
| EP | 1274619 | 1/2003 |
| EP | 0987670 | 9/2003 |
| FR | 1586336 | 1/1970 |
| FR | FR 1.586.336 | 2/1970 |
| FR | 2 797 607 | 2/2001 |
| JP | 05-318672 | 12/1993 |
| JP | 2003301843 A | 10/2002 |
| JP | 200417541 | 1/2004 |
| WO | WO 00/16978 | 3/2000 |
| WO | WO 00/32412 | 6/2000 |
| WO | 00/46316 | 8/2000 |
| WO | WO 00/46316 | 8/2000 |
| WO | 01-10701 | 2/2001 |
| WO | WO 01/10701 | 8/2001 |

OTHER PUBLICATIONS

Office action dated Jun. 10, 2002 from prior U.S. Appl. No. 09/801,187.
Amendment dated Nov. 25, 2002 from prior U.S. Appl. No. 09/801,187.
Office action dated Mar. 11, 2003 from prior U.S. Appl. No. 09/801,187.
Amendment dated Jun. 27, 2003 from prior U.S. Appl. No. 09/801,187.
Office action dated Sep. 9, 2003 from prior U.S. Appl. No. 09/801,187.
Amendment dated Mar. 4, 2004 from prior U.S. Appl. No. 09/801,187.
Office action dated May 27, 2004 from prior U.S. Appl. No. 09/801,187.
Amendment dated Jun. 15, 2004 from prior U.S. Appl. No. 09/801,187.
Office action dated Sep. 14, 2004 from prior U.S. Appl. No. 09/801,187.
Amendment dated Jan. 14, 2005 from prior U.S. Appl. No. 09/801,187.
Examiner's Interview Summary dated May 23, 2005 from prior U.S. Appl. No. 09/801,187.
Amendment dated Jun. 24, 2005 from prior U.S. Appl. No. 09/801,187.
Miscellaneous action w/SSP dated Sep. 7, 2005 from prior U.S. Appl. No. 09/801,187.
Response dated Oct. 7, 2005 from prior U.S. Appl. No. 09/801,187.
Office action dated Feb. 9, 2006 from prior U.S. Appl. No. 09/801,187.
Examiner's interview summary dated May 10, 2006 from prior U.S. Appl. No. 09/801,187.
Amendment dated Jul. 12, 2006 from prior U.S. Appl. No. 09/801,187.
Office action dated Oct. 12, 2006 from prior U.S. Appl. No. 09/801,187.
Amendment dated Feb. 21, 2007 from prior U.S. Appl. No. 09/801,187.
Office action dated May 3, 2007 from prior U.S. Appl. No. 09/801,187.
Amendment dated Nov. 2, 2007 from prior U.S. Appl. No. 09/801,187.
Office action dated Jan. 28, 2008 from prior U.S. Appl. No. 09/801,187.
Amendment dated Apr. 11, 2008 from prior U.S. Appl. No. 09/801,187.
Office action dated Jun. 3, 2008 from prior U.S. Appl. No. 09/801,187.
Amendment dated Sep. 15, 2008 from prior U.S. Appl. No. 09/801,187.
Office action dated Dec. 4, 2008 from prior U.S. Appl. No. 09/801,187.
Amendment dated Dec. 11, 2008 from prior U.S. Appl. No. 09/801,187.
Office action dated Dec. 29, 2008 from prior U.S. Appl. No. 09/801,187.
Amendment dated Jun. 3, 2009 from prior U.S. Appl. No. 09/801,187.
Office action dated Jul. 18, 2003 from corresponding French Application No. 200108593.
Restriction requirement dated Jul. 21, 2009 from prior U.S. Appl. No. 09/801,187.

Amendment dated Aug. 17, 2009 from prior U.S. Appl. No. 09/801,187.

Office Action dated Sep. 22, 2009 from prior U.S. Appl. No. 09/801,187.

Amendment dated Dec. 14, 2009 from prior U.S. Appl. No. 09/801,187.

Notice of Allowance dated Mar. 26, 2010 from prior U.S. Appl. No. 09/801,187.

Amendment dated Jul. 13, 2009 from prior German Application No. 10127654.0.

Office Action dated Oct. 17, 2005 from prior German Application No. 10127654.0.

Response dated Aug. 30, 2006 from prior German Application No. 10127654.0.

Amendment dated Dec. 5, 2007 from prior German Application No. 10127654.0.

* cited by examiner

PRINTABLE AND SPLITTABLE MEDIUM

CROSS-REFERENCE TO RELATED APPLICATIONS

This is a continuation of copending U.S. patent application Ser. No. 09/801,187, filed Mar. 8, 2001, whose entire contents are hereby incorporated by reference, and which claims the benefit of Japanese applications JP 71013/2000, filed Mar. 9, 2000, and JP 152774/2000, filed May 19, 2000.

BACKGROUND OF THE INVENTION

Output paper or films on the market at present has disadvantage that in the case of making a visiting card or the like smaller than the original output size, in the case of making multi-print and cutting off the same, or in the case of overall coat printing, generally the prints are cut off by a cutter or scissors, or previously the paper or films are perforated to be separated after printing, which causes the trouble of using tools or a mistake in cutting, or in the case of a perforation, jagged cutoff edges remarkably cause degradation.

SUMMARY OF THE INVENTION

A resin film integrated with a photo or the like is previously provided with slits, and after receiving an image, the resin film is cut off at the slits to produce very fine and beautiful divided parts. It is possible to divide into parts more simply and finely as compared with the case of dividing photos or the like along a perforation in the past. In some method, an adhesive layer is used in the intermediate portion, and in the other method, an intermediate layer is not used.

EMBODIMENT 1

An image dividing film, in which a resin film to be divided is previously provided with grooves, whereby images or characters output on the film are finely divided along the grooves.

EMBODIMENT 2

An image dividing film, in which a resin film to be divided is as the lowermost layer, an adhesive layer is provided thereon, a paper or plastic film with image receiving layer coat for each printer is provided thereon to form a three-layer structure, and grooves are cut in the paper or the plastic film and the adhesive layer to be divided by a cutter, the grooves entering a portion of the resin film to be divided, whereby a user bends the film along the slits to finely divide output images or characters along the grooves.

EMBODIMENT 3

The image dividing film according to Embodiment 1 or 2, wherein the resin film to be divided is a cellulosic film.

EMBODIMENT 4

The image dividing film according to Embodiment 2, wherein the depth and groove width of a slit to the resin film to be divided are varied depending on the raw material characteristics and thickness of the resin film to be divided.

EMBODIMENT 5

The image dividing film according to Embodiment 1, wherein dissolved resin is directly applied to a printing paper or film to form a two-layer structure of the printing paper or film and the resin film to be divided without an adhesive layer.

EMBODIMENT 6

The image dividing film according to Embodiments 1 to 5, wherein various coats by ink jet laser, sublimation and the like are applied to the resin film to be divided to cope with various uses.

EMBODIMENT 7

The image dividing film according to Embodiments 1 to 5, wherein the resin film to be divided is compounded with every raw material including paper or film coated with various image receiving layers by ink jet laser or sublimation and the like to meet various uses.

EMBODIMENT 8

An image dividing film for multiple sizes, in which one side surface of a resin film to be divided is subjected to various image receiving layer coat treatment by ink jet laser, sublimation and the like, and the surface thereof opposite to the treated surface is provided with many fine slits as ruled into squares, whereby a user is capable of freely setting dividing positions.

EMBODIMENT 9

The image dividing film according to Embodiment 8, wherein a paper or plastic film layer made of polyethylene, polypropylene, polyester or the like is laminated on the surface of the resin film to be divided opposite to the image receiving layer coat surface to effect the image dividing film inexpensively, the grooves completely divide and cut the paper and the resin layer, and the grooves enter a portion of the resin film to be divided.

EMBODIMENT 10

An image dividing film, in which slits as ruled into squares are provided extending to a little lower part of an adhesive layer, thereby dividing and cutting off along the slits as ruled into squares.

DESCRIPTION OF PREFERRED EMBODIMENTS

Figure 1:
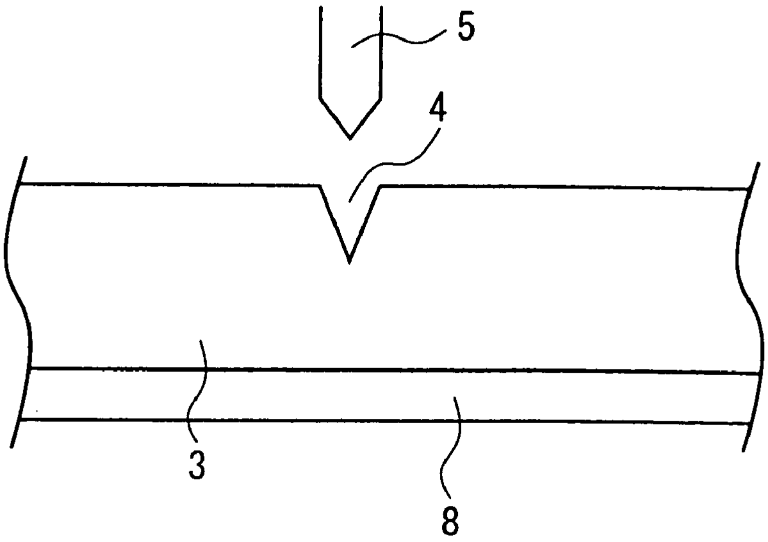
FIG. 1 is a sectional view of an image dividing film according to a first embodiment of the invention.

This invention relates to paper or a film for printing output which may simplify various type of cutting off for various cards such as a visiting card or various sizes of photos and very finely achieve cutting off after prints are output from a digital camera or a photo CD.

In the drawings, the reference numeral 1 designates paper or a plastic film with an image receiving layer coat, 2 an adhesive layer, 3 a resin film to be divided, 4 a slit, 5 a cutter, 6 an image, 7 an edge part, 8 an image receiving layer, and 9 a reinforcement paper or plastic film layer.

Figure 3:
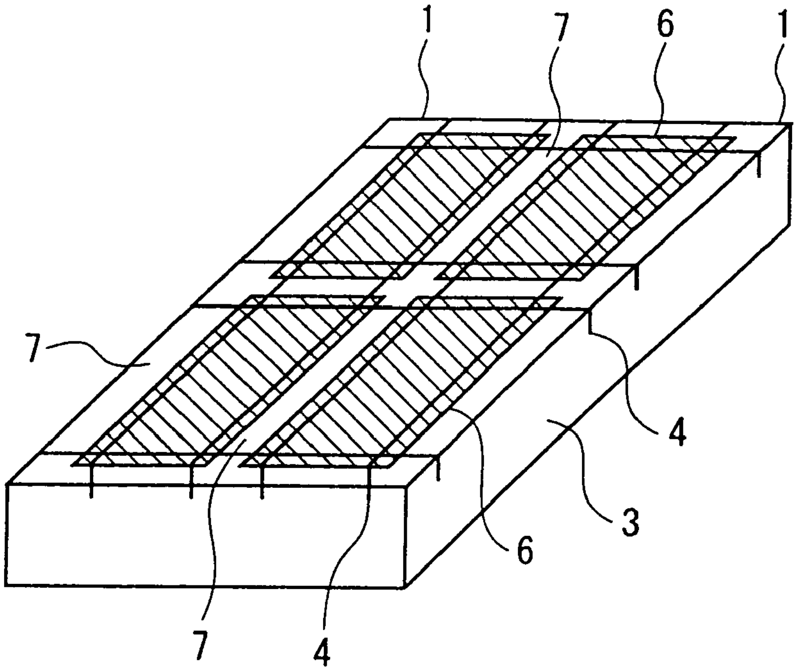
FIG. 3 is a perspective view of the image dividing film according to the first embodiment of the invention.

A first embodiment of the invention is shown in FIGS. 1 and 3.

According to the invention, the resin film 3 to be divided is as a base, an image receiving coat 8 suitable for each printer is applied to one side or both sides thereof, and a slit 4 of each size depending on purpose is previously made in either the surface or the back surface by the cutter 5. A user purchases such slit film, and after purchasing, the user prints images, characters or the like thereon according to a cutoff size, bends the film upward or downward along the slit, and then cuts off by utilizing its property of splitting along the slit of the resin film to be divided.

As the stage of manufacture, a white coat or a mat coat is previously applied as needed to one side or both sides of a resin film to be divided as a base according to purpose, subsequently an image receiving coat 8 suitable for a printer is applied thereto, and a slit 4 is made in one side or both sides according to each intended size.

As shown in FIG. 3, at the time of separating images or characters into four faces, previously four longitudinal and four horizontal slits are made inside the portions corresponding to the image 6 of four faces, and after the image portions are printed out, dividing can be finely achieved along the slits.

Figure 2:
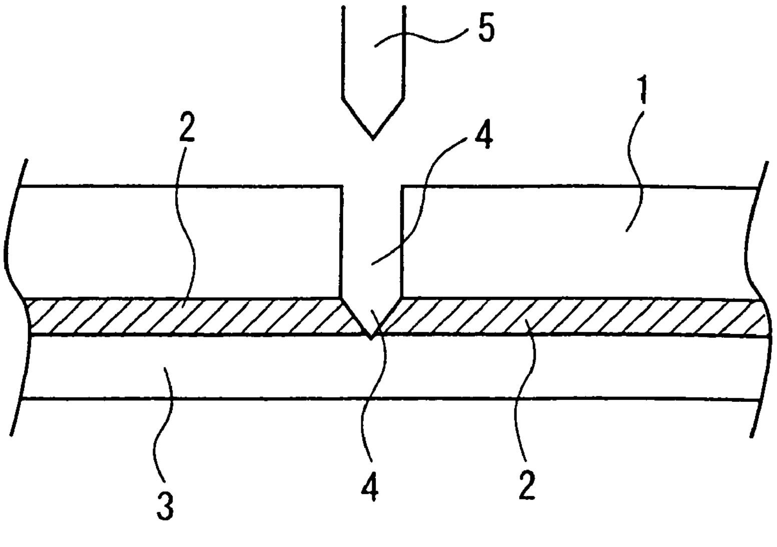
FIG. 2 is a sectional view of an image dividing film according to a second embodiment of the invention.
Figure 4:
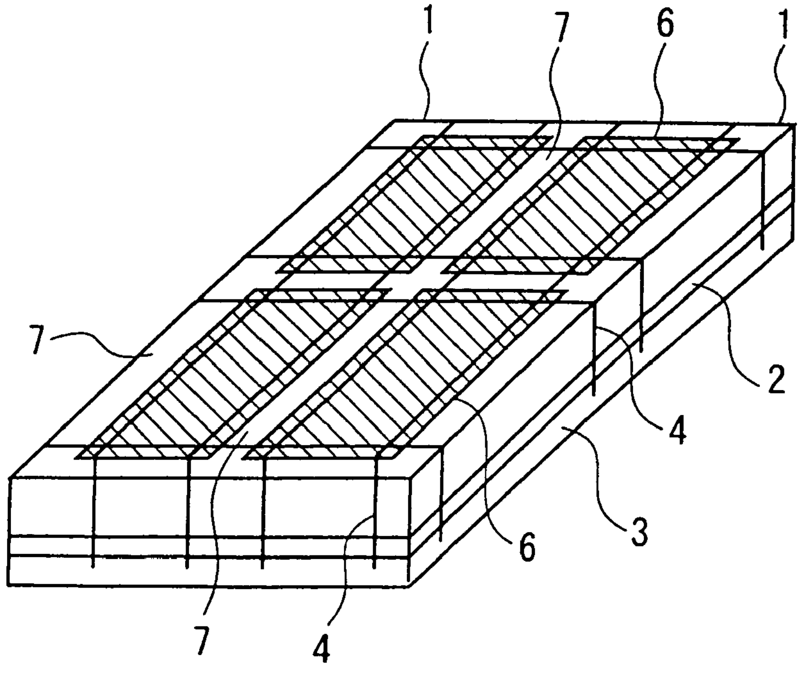
FIG. 4 is a perspective view of the image dividing film according to the second embodiment of the invention.

A second embodiment will now be described with reference to FIGS. 2 and 4.

An adhesive layer 2 is provided on the lower side of paper or a plastic film 1 with image receiving layer coat, and a resin film 3 to be divided is provided under the adhesive layer 2 to form a three-layer structure. As shown in FIG. 4, in the case of cutting away image portions of four faces, previously four longitudinal slits 4 and four horizontal slits 4 are made by a cutter.

The slits 4 completely divide the paper or plastic film 1 with image receiving layer coat and further partially divide an upper part of the lowermost resin film 3 to be divided.

The depth, groove width and shape of each slit vary depending on the thickness of the resin film to be divided.

When a user performs printing-out according to the image portions of the paper or plastic film 1 with image receiving layer coat and bends the print several times as in the perforation heretofore in use, the resin film to be divided can be well divided at the slits in its property to accomplish fine separation.

In the drawings, the reference numeral 7 designates the useless edge parts to be thrown away.

A third embodiment will now be described.

Figure 5:
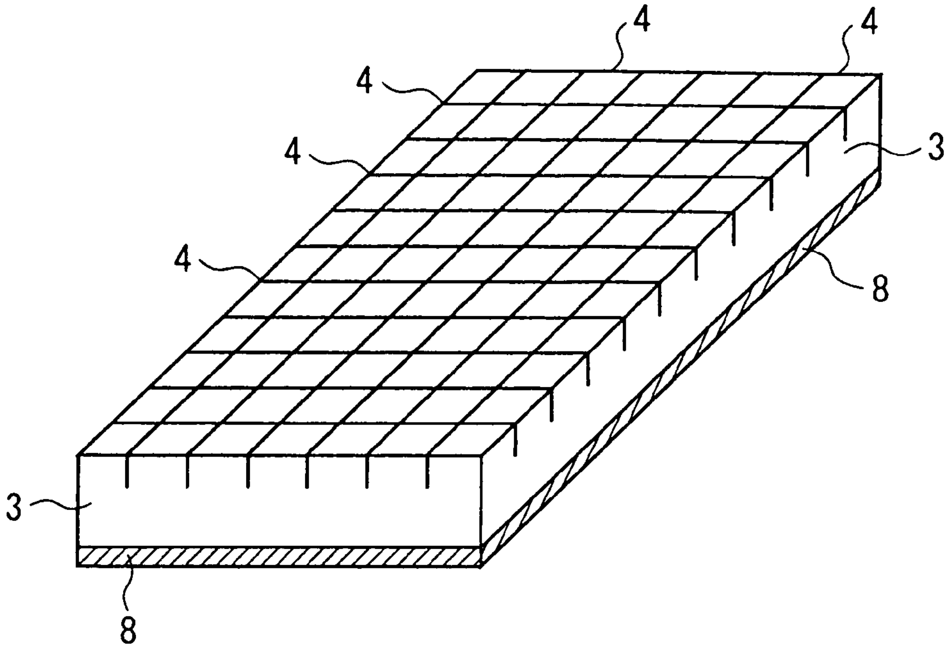
FIG. 5 is a perspective view of an image dividing film according to a third embodiment of the invention.

As shown in FIG. 5, the surface of a resin film to be divided opposite to the surface thereof applied with the image receiving layer coat 8 is provided with many fine slits as ruled into squares.

A user prints out characters or images on the image receiving layer coat 8 surface in a desired assembling manner with desired dimension, and the slit portion nearest a position desired to be cut off by the user is bent upward and downward as in the perforation heretofore in use to finely accomplish dividing.

A fourth embodiment will now be described.

Figure 6:
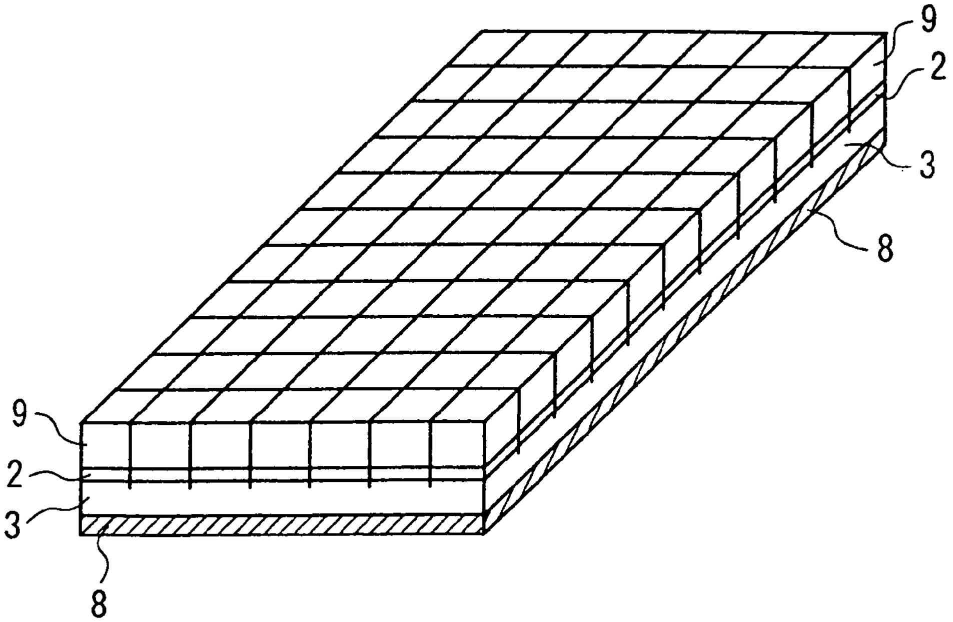
FIG. 6 is a perspective view of an image dividing film according to a fourth embodiment of the invention.

As shown in FIG. 6, the surface of a resin film to be divided opposite to the surface thereof applied with an image receiving layer coat 8 is laminated with paper, or a plastic film 9 for reduction of cost and reinforcement.

Further, similarly to the second embodiment, an adhesive layer is provided in the intermediate part.

The surface laminated with paper or a plastic film and the adhesive layer 2 are completely divided, and similarly to the third embodiment, many fine slits 4 as ruled into squares are made in a portion of the resin film to be divided.

Similarly to the third embodiment, a user prints out images or characters on the image receiving layer coat 8 surface an a free assembling manner with desired dimension, and the slit portion nearest a position desired to be cut off by the user is bent upward and downward as in the perforation heretofore in use to finely accomplish dividing.

INDUSTRIAL APPLICABILITY

Although in a conventional method of dividing at the perforation, a cut end is bad, in the methods described above, dividing can be accomplished beautifully and finely, so the invention is of very high utility value.

That is, when dividing is performed according to these four methods, the photos can be divided finely in the property of the resin film to be divided, so that the value of merchandise is very heightened.

What is claimed is:

1. A splittable medium comprising:

a print receptive first layer;

a top surface of the first layer defining a top surface of the splittable medium;

a second layer attached to a planar surface of the first layer;

the first and second layers at least substantially forming a multi-layer sheet;

all layers of the multi-layer sheet having the same width and length dimensions and being coextensive with one another;

the first layer being subdivided by a plurality of horizontal continuous cut lines and a plurality of vertical continuous cut lines into a plurality of medium portions; and the cut lines being through-cut through the first layer and spaced a distance above a bottom surface of the splittable medium;

wherein the splittable medium is configured to be folded on one of the cut lines causing the splittable medium to subdivide into two separate portions, each of which includes a portion of the first layer and a portion of the second layer attached thereto.

2. The splittable medium of claim 1 wherein the horizontal and vertical cut lines define a grid.

3. The splittable medium of claim 1 wherein the first layer is a paper layer.

4. The splittable medium of claim 3 wherein the paper layer is a card stock layer.

5. The splittable medium of claim 1 wherein the second layer is a polymeric film layer.

6. The splittable medium of claim 5 wherein the polymeric film layer is a cellulosic resin film layer.

7. The splittable medium of claim 1 wherein the splittable medium is configured to be folded towards the first layer.

8. The splittable medium of claim 1 wherein a bottom surface of the multi-layer sheet defines a bottom surface of the splittable medium.

9. The splittable medium of claim 8 wherein the bottom surface of the multi-layer sheet is free of cut lines.

10. The splittable medium of claim 1 wherein the plurality of medium portions are arranged as a series of medium portions.

11. The splittable medium of claim 1 wherein the cut lines extend less than an entire thickness of the second layer.

12. The splittable medium of claim 1 wherein the first layer is a photographic medium layer.

13. The splittable medium of claim 1 wherein the multi-layer sheet is configured and constructed to be subjected to a printing operation by a printer and the multi-layer sheet has an outer surface structurally capable of receiving an image or a character thereon during the printing operation.

14. The splittable medium of claim 13 wherein the outer surface is on the first layer.

15. The splittable medium of claim 13 wherein the outer surface is on the second layer.

16. The splittable medium of claim 1 wherein the splittable medium is configured to be folded upward or downward.

17. The splittable medium of claim 1 further comprising adhesive attaching the first and second layers together.

18. The splittable medium of claim 1 wherein the first and second layers are directly attached together.

19. The splittable medium of claim 18 wherein the first and second layers are directly attached together with adhesive.

20. The splittable medium of claim 1 wherein the plurality of vertical continuous cut lines includes at least three vertical continuous cut lines and the plurality of horizontal continuous cut lines includes at least three horizontal continuous cut lines.

21. A splittable medium comprising:

a first layer;

the first layer being a paper layer;

a second layer attached to a planar surface of the first layer;

the second layer being a polymeric film layer;

the first and second layers at least substantially forming a multi-layer sheet;

all layers of the multi-layer sheet having the same width and length dimensions and being coextensive with one another;

the first layer being subdivided by a plurality of horizontal continuous cut lines and a plurality of vertical continuous cut lines into a plurality of medium portions;

the horizontal and vertical cut lines defining a grid;

the cut lines being through-cut through the first layer but extending less than a thickness of the splittable medium; and an image receiving layer on the first layer;

wherein the splittable medium is configured to be folded on one of the cut lines and towards the first layer causing the splittable medium to subdivide into two separate portions, each of which includes a portion of the first layer and a portion of the second layer attached thereto.

22. The splittable medium of claim 21 wherein the first and second layers are directly attached together.

23. The splittable medium of claim 22 wherein the first and second layers are directly attached together with adhesive.

24. The splittable medium of claim 21 wherein the polymeric film layer is a cellulosic resin film layer.

25. The splittable medium of claim 21 wherein the paper layer is a card stock layer.

26. The splittable medium of claim 21 wherein the plurality of vertical continuous cut lines includes at least three vertical continuous cut lines and the plurality of horizontal continuous cut lines includes at least three horizontal continuous cut lines.

27. A splittable medium comprising:

a print receptive first layer;

a top surface of the first layer defining a top surface of the splittable medium;

a second layer attached to a planar surface of the first layer;

the first and second layers at least substantially forming a multi-layer sheet;

all layers of the multi-layer sheet having the same width and length dimensions and being coextensive with one another;

the first layer being subdivided by a plurality of horizontal continuous cut lines and a plurality of vertical continuous cut lines into a plurality of medium portions;

the cut lines being through-cut through the first layer and spaced a distance above a bottom surface of the splittable medium; and the second layer comprising a splittable material that is splittable in a direction perpendicular to the top surface;

wherein the splittable medium is configured to be folded on one of the cut lines causing the splittable medium to subdivide into two separate portions, each of which includes a portion of the first layer and a portion of the second layer attached thereto.

28. A splittable medium comprising:

a print receptive first layer;

the first layer being a paper layer;

a second layer attached to a planar surface of the first layer;

the second layer being a polymeric film layer;

the first and second layers at least substantially forming a multi-layer sheet;

all layers of the multi-layer sheet having the same width and length dimensions and being coextensive with one another;

the first layer being subdivided by a plurality of horizontal continuous cut lines and a plurality of vertical continuous cut lines into a plurality of medium portions;

the horizontal and vertical cut lines defining a grid;

the cut lines being through-cut through the first layer but extending less than a thickness of the splittable medium;

the splittable medium being configured and constructed to be subjected to a printing operation by a printer and having an outer surface constructed to receive an image or a character thereon during the printing operation; and the second layer comprising a splittable material that is splittable in a direction perpendicular to the planar surface;

wherein the splittable medium is configured to be folded on one of the cut lines causing the splittable medium to subdivide into two separate portions, each of which includes a portion of the first layer and a portion of the second layer attached thereto.

29. A splittable medium comprising:

a print receptive first layer;

a top surface of the first layer defining a top surface of the splittable medium;

a second layer attached to a planar surface of the first layer;

the first and second layers at least substantially forming a multi-layer sheet;

all layers of the multi-layer sheet having the same width and length dimensions and being coextensive with one another;

the first layer being subdivided by a plurality of horizontal continuous cut lines and a plurality of vertical continuous cut lines into a plurality of medium portions; and the cut lines being through-cut through the first layer and spaced a distance above a bottom surface of the splittable medium;

wherein the splittable medium is configured to be folded on one of the cut lines causing the splittable medium to split into separate portions, each of the separate portions including a portion of the first layer and a portion of the second layer attached thereto.

30. The splittable medium of claim 29 wherein the splittable medium splits by only folding the splittable medium towards the first layer.

31. The splittable medium of claim 29 wherein the first layer is a paper layer.

32. The splittable medium of claim 31 wherein the paper layer is a card stock layer.

33. The splittable medium of claim 29 wherein the second layer is a polymeric film layer.

34. The splittable medium of claim 29 wherein the horizontal and vertical cut lines define a grid of cut lines on the top surface.

35. The splittable medium of claim 1 wherein each of the portions has a top surface formed by a portion of an exposed top surface of the splittable medium and a bottom surface formed by a portion of an exposed bottom surface of the splittable medium.

36. The splittable medium of claim 21 wherein each of the portions has a top surface formed by an exposed top surface of the splittable medium and a bottom surface formed by a portion of an exposed bottom surface of the splittable medium.

37. The splittable medium of claim 29 wherein each of the portions has a top surface formed by a portion of an exposed top surface of the splittable medium and a bottom surface formed by a portion of an exposed bottom surface of the splittable medium.

38. The splittable medium of claim 1 wherein the splittable medium subdivides after the splittable medium is folded only once.

* * * * *